Dec. 19, 1933.   R. L. HASCHE   1,939,695
REFRIGERATION SYSTEM
Original Filed Nov. 26, 1930
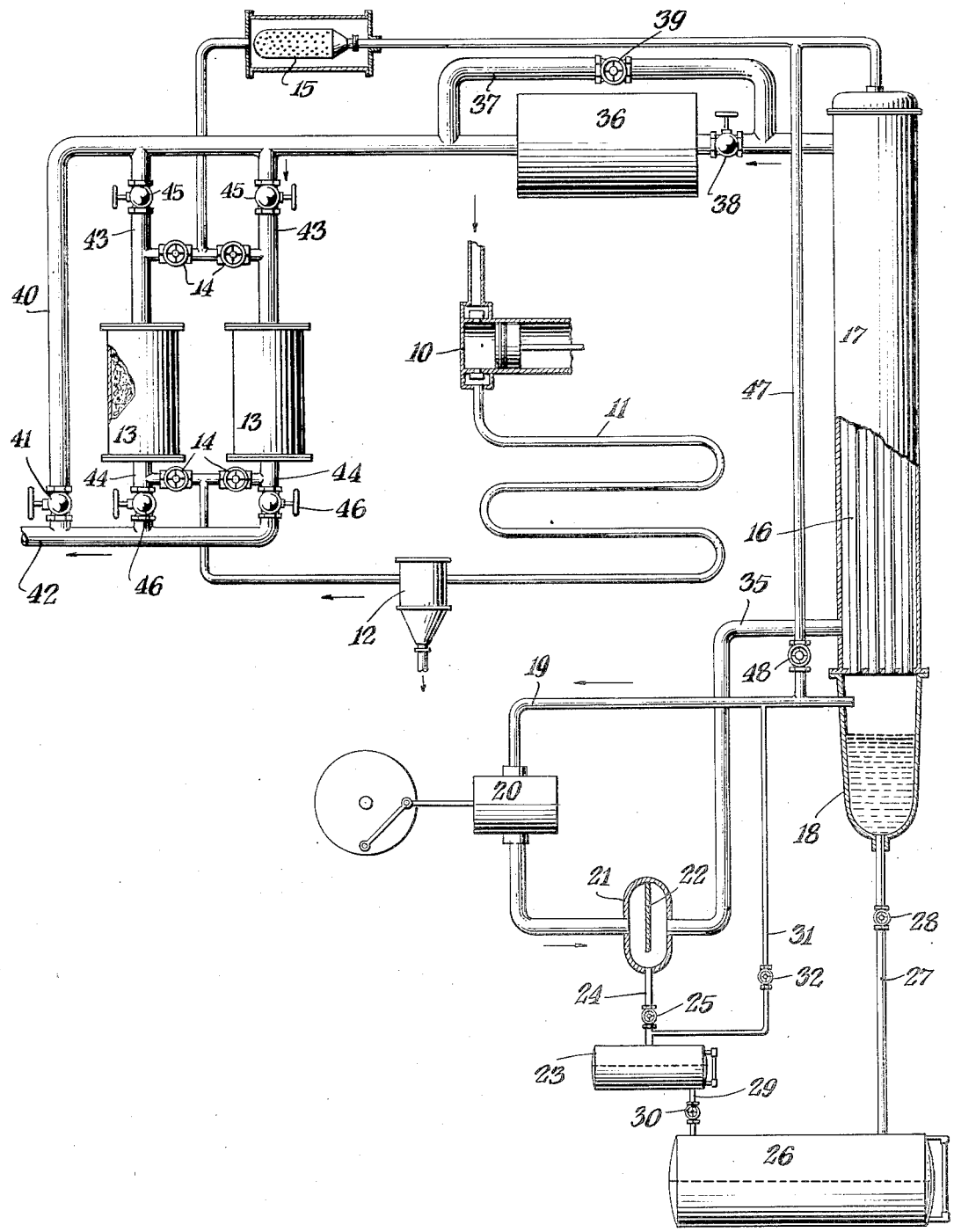
Inventor
Rudolph Leonard Hasche
By his Attorneys
Austin + Dip Patented Dec. 19, 1933

1,939,695

UNITED STATES PATENT OFFICE 1,939,695

REFRIGERATION SYSTEM

Rudolph Leonard Hasche, Red Bank, N. J., assignor to American Smelting and Refining Company, New York, N. Y., a corporation of New Jersey Application November 26, 1930, Serial No. 498,222
Renewed September 15, 1933

13 Claims. (Cl. 62—123)

This invention relates to a refrigerating system which is adapted for the removal of a gaseous constituent from a gas mixture by selective liquefaction.

The present system is particularly adapted to obtain a substantially complete separation of the desired constituent in the liquid form. For this purpose the dry gas mixture is cooled through practically the entire liquid range of the desired constituent at the partial pressure involved to a temperature which approaches the solidification temperature thereof and the liquid is removed from the system at this low temperature.

The invention also provides for efficiently drying the gases before the cooling cycle as by means of a bed of adsorbent material and provides for reactivating the bed by means of the dry stripped gases prior to venting the same into the atmosphere.

The system is particularly applicable to the liquefaction and recovery of sulphur dioxide from mixtures, such as furnace gases, which contain varying percentages thereof. It may, however, be applied to other gases which are capable of being treated in the same cycle of steps.

The invention also consists in certain new and original features of construction and combinations of parts hereinafter set forth and claimed.

Although the novel features which are believed to be characteristic of this invention will be particularly pointed out in the claims appended hereto, the invention itself as to its objects and advantages, and the manner in which it may be carried out may be better understood by referring to the following description taken in connection with the accompanying drawing forming a part thereof, in which the figure is a diagrammatic representation of the system arranged in accordance with the present invention.

In the following description and in the claims parts will be identified by specific names for convenience, but they are intended to be as generic in their application to similar parts as the art will permit.

Referring to the drawing more in detail the system is shown as comprising a compressor 10 in which the gaseous mixture, for example, furnace gases which have previously been cleaned of undesirable constituents, is compressed to a comparatively high pressure such as 20 atmospheres. The heat of compression is removed by passing the gas mixture through cooling coils 11 and the mist which is formed as the gas is cooled, is removed in separator 12.

The gases are then passed through one of a pair of beds 13 of adsorbent material, such as silica gel, which is capable of adsorbing moisture and substantially completely drying the gaseous mixture. A plurality of valves 14 are arranged to permit the gases to be applied to either of the beds 13 while the other of said beds is cut out of service for reactivation. Thereafter, the gases may be passed through a filter, such as a bag 15, capable of removing the dust particles, which may be picked up in the adsorber. Any desired form of filter may be employed which is capable of removing the fine dust particles without seriously interfering with the gas flow.

The dried gases while under high pressure pass through the tubes 16 of a heat exchanger 17 in which they are cooled, preferably to a temperature at which a portion of the sulphur dioxide becomes liquefied, as for example, a temperature of —15° C. and —25° C. This liquefied portion is collected in a sump 18 at the bottom of exchanger 17 and the gases are removed through pipe 19 and applied to expanding engine 20 in which the gases are expanded adiabatically with the production of external work.

This expansion is regulated to cool the gases down to substantially the solidification temperature of the desired material. In the case of sulphur dioxide the gases would be cooled to a temperature which approaches —73° C., the solidification temperature of sulphur dioxide. Temperatures of approximately —70° C. have been found suitable for this purpose.

The cold gases, which are now at a low pressure, such as 1½ to 2 atmospheres carry the sulphur dioxide in the form of a mist which is removed by passing the gases through a separator 21 having for example a baffle 22. The liquid which is thus separated is drained into tank 23 through a pipe 24 which is provided with a valve 25. A reservoir 26 is connected with sump 18 by pipe 27 having a valve 28 and to tank 23 through a pipe 29 having a valve 30. A high pressure line 31 having valve 32 interconnects pipe 19 with the pipe 24 above tank 23.

The arrangement is such that the system is normally operated with valves 28 and 30 closed. In order to remove the liquid from sump 18, valve 28 may be opened and the high pressure of the gas in exchanger 17 will force the liquid into reservoir 26. The tank 23, however, is under low pressure and in order to drain the contents thereof into reservoir 26 it is necessary to close valve 25 and to open valve 32 thereby permitting high pressure gases to be applied from pipe 19 through line 31 to the tank 23. Valve 30 may then be opened to permit the liquid within said tank to drain into the reservoir 26.

The cold, low pressure gases from which the liquid sulphur dioxide has been removed, which may be termed "the stripped gases" then pass through pipe 35 into heat exchanger 17 and are caused to flow upwardly around tubes 16 in a direction counter to the direction of high pressure gas flow in said pipes. The stripped gases are used as the refrigerant in exchanger 17 for producing the initial cooling of the incoming gases to the temperature above mentioned.

These gases are then passed through heater 36 which may comprise any desired type of heating device, such as an oil heater, or may be by-passed around said heater through pipe 37, the flow of gases in said heater and in said by-pass being controlled by valves 38 and 39. The stripped gases may then be applied through pipe 40 and valve 41 to a discharge pipe 42 by which they are vented to the atmosphere or they may be passed through a selected adsorbent bed 13 by means of by-pass pipes 43 and 44 which are controlled by valves 45 and 46 respectively. A by-pass 47, controlled by valve 48 is also connected in the high pressure line around exchanger 17 for the purpose to be described.

In the operation of the above system the compressed gases which have been cooled to approximately atmospheric temperature by cooling coils 11 and have had the water vapor mist removed in separator 12 are passed through one of the silica gel beds 13 in which substantially the remainder of the moisture is removed. If any dust, such as fine silica gel particles, is present in the gases it is removed by bag filter 15 after which the dried gases are applied to heat exchanger 17 and cooled by heat interchange with the cold stripped gases. The amount of cooling which is obtained in exchanger 17 may be controlled by means of by-pass 47 and valve 48 which permits a portion of the high pressure gases at approximately atmospheric temperature to be by-passed around exchanger 17 and to be mixed with the gases which have been cooled therein. This regulation is preferably such that the further cooling in the expanding engine 20 produces the desired temperature in the mixture.

High pressure gases are finally cooled in the expanding engine 20 to a point at which substantially the entire content of $SO_2$ becomes liquid and may be removed in separator 21, after which the stripped gases are used as the heat exchange medium in exchanger 17 as above described.

The dry stripped gases after passing through said exchanger are particularly suitable for reactivation of the adsorbent beds. For this purpose a portion of the gases may be passed through heater 36 and heated to a suitable temperature for reactivation of said beds. The heated gases are then passed through the bed to be reactivated and serve to heat the same sufficiently to drive out the moisture. After the bed has been reactivated it is preferable to cool the same before applying the incoming gases thereto. This cooling can be accomplished by by-passing heater 36 and applying to the beds cold, stripped gases which may be at a temperature of 10° C. to 15° C. below atmospheric. When the gases are not required for reactivation of the beds, valves 45 and 46 may be closed and all of the stripped gases are then vented through pipe 40 into a flue, not shown.

In the above described system it will be noted that the gases are continually cooled until they reach their lowest temperature at which point the sulphur dioxide is removed therefrom and thereafter the cold stripped gases are used as a source of refrigeration. This is accomplished by providing a countercurrent flow in exchanger 17 so that the incoming gases are progressively cooled as they pass through said exchanger. This feature permits the liquefied portion to be removed in sump 18 without coming into further contact with the gases. Obviously, if the liquid were not removed at the coldest point, a gas and liquid contact would result which would partially warm the gases and in some cases might prevent the removal of appreciable quantities of liquid.

The dry stripped gases are particularly efficient for the reactivation of beds 13 and the removal of moisture therefrom. The system has been described for convenience as applied to the separation of sulphur dioxide from furnace gases. It is obvious, however, that it may be used for the separation of other gases from gas mixtures which possess similar properties.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a refrigeration system, a heat exchanger having means therein to collect a liquefied constituent under high pressure, an expanding engine for receiving gases after being passed through said exchanger and causing adiabatic expansion thereof to a low pressure, means for collecting a liquefied constituent at said low pressure, a reservoir adapted to receive said liquefied constituent from said exchanger and from said collecting means, and means for applying high pressure to said last mentioned collecting means to permit the liquid therein to be discharged into said reservoir.

2. In a refrigeration system, a heat exchanger having a sump, a liquid reservoir, a pipe interconnecting said sump and reservoir, a low pressure tank adapted to receive liquid under low pressure, a pipe interconnecting said tank and said reservoir and a pressure pipe interconnecting said tank and said exchanger for permitting the pressure of said exchanger to be applied to said tank whereby the pressure between said tank and said reservoir is equalized and liquid flow may take place therebetween.

3. In a refrigeration system, means for compressing and cooling a gas, a pair of beds of material capable of adsorbing moisture therefrom, means for applying said gas to one of said beds whereby said gases are dried, means for cooling said dried gases to a point at which a constituent is selectively liquefied and removed therefrom, means for utilizing the stripped gases as a source of refrigeration for said cooling, and means for heating the stripped gases and passing the same through the other of said beds whereby said bed is reactivated.

4. In a refrigeration system, means for compressing and cooling a gas, a pair of beds of material capable of adsorbing moisture therefrom, means for applying said gas to one of said beds whereby said gases are dried, means for cooling said dried gases to a point at which a constituent is selectively liquefied and removed therefrom, means for utilizing the stripped gases as a source of refrigeration for said cooling, and means for heating the stripped gases and passing the same through the other of said beds whereby said bed is reactivated and means for thereafter by-passing said heater and passing cold stripped gases through said bed for cooling said bed prior to application of incoming gases thereto.

5. In a refrigeration system in which a gas is compressed and progressively cooled to a temperature suitable for liquefaction of a constituent thereof, a drying means comprising a bed of adsorbent material through which said gas is passed after compression and means for heating the stripped dry gas to the reactivation temperature and passing the same through said bed whereby the moisture is driven from said bed and means for passing cold dry stripped gases through said bed after reactivation for cooling the same prior to application of incoming gases thereto.

6. A refrigeration system comprising means for compressing a gas and removing the heat of compression therefrom, a separator for removing the mist from the cool gas, a bed of adsorbent material and means for passing said gas through said bed for completely drying the same, a heat exchanger adapted to partially cool said gas, means for passing said gas through said heat exchanger, means for adiabatically expanding said gas with the production of external work to effect further refrigeration thereof to a temperature at which a constituent is liquefied, means for removing said liquefied constituent, means for using the stripped gases as a cooling medium in said heat exchanger, and means for thereafter heating said gases and applying the same to a bed of adsorbent material for reactivating the same.

7. A refrigeration system comprising means for compressing a gas and removing the heat of compression therefrom, a separator for removing the mist from the cool gas, a bed of adsorbent material and means for passing said gas through said bed for completely drying the same, a heat exchanger adapted to partially cool said gas, means for passing said gas through said heat exchanger, means for adiabatically expanding said gas with the production of external work to effect further refrigeration thereof to a temperature at which a constituent is liquefied, means for removing said liquefied constituent, means for using the stripped gases as a cooling medium in said heat exchanger, means for thereafter heating said gases and applying the same to a bed of adsorbent material for reactivating the same, and means for by-passing said heater to pass cold gases through said bed for cooling said bed prior to application of incoming gases thereto.

8. A refrigeration system comprising a heat exchanger and an expanding engine, means for passing a gas in sequence through said exchanger and through said engine, and a by-pass for by-passing a portion of the gas around said exchanger for controlling the temperature of the gas applied to said expanding engine.

9. A method of refrigeration which comprises passing a gas in sequence through a heat exchanger and through an expanding engine whereby progressive cooling is obtained, and by-passing a portion of the gas around said exchanger for controlling the temperature of the gas applied to said expanding engine.

10. In combination, a source of liquid under high pressure, a source of liquid under low pressure, a reservoir, means connecting said reservoir to both of said sources and means interconnecting said low pressure source and said high pressure source and operable to equalize the pressure in said reservoir and said low pressure source to permit discharge of said liquid from said low pressure source into said reservoir.

11. In combination a source of liquid under high pressure, a source of liquid under low pressure, a reservoir, a connection between said reservoir and said high pressure source to permit discharge of liquid from said high pressure source into said reservoir, a valve for closing said connection, a connection between said low pressure source and said reservoir, a valve for closing said connection when said first mentioned valve is opened, and means for supplying high pressure to said low pressure source whereby to permit liquid to flow therefrom into said reservoir.

12. In combination, a liquid separator for separating a liquid from a gas at low pressure, a receiver connected therewith for storing said liquid at said low pressure, a receiver for storing additional liquid at high pressure, a reservoir, means connecting said reservoir to both of said receivers and means for disconnecting said first receiver from said separator and connecting said first receiver to the pressure of said reservoir whereby to cause discharge of liquid from said first receiver into said reservoir.

13. In a refrigeration system, a pair of beds of material capable of adsorbing moisture, means for supplying compressed and partially dried gas to one of said beds, a heat exchanger, means for passing the gas discharged from said bed through said exchanger, a by-pass associated with said exchanger for controlling the portion of the gas passed therethrough, an expanding engine, means supplying gas from said exchanger and said by-pass to said engine, a separator associated with the low pressure side of said engine for separating liquid from the expanded gas, means for supplying the gas, stripped of said liquid, to said exchanger in heat transfer relationship with the first mentioned gas therein, a heater for the stripped gas discharged from said exchanger, means to supply the heated stripped gas to the other of said beds for reactivation thereof, a by-pass for said heater, and means to collect the separated liquid from said separator and from said exchanger.

RUDOLPH LEONARD HASCHE.